June 19, 1951  S. E. DAWSON  2,557,080
MAGNETOELECTRIC TRANSDUCER FOR MEASUREMENT
OF VELOCITY AND RELATED VALUES
Filed Sept. 16, 1948
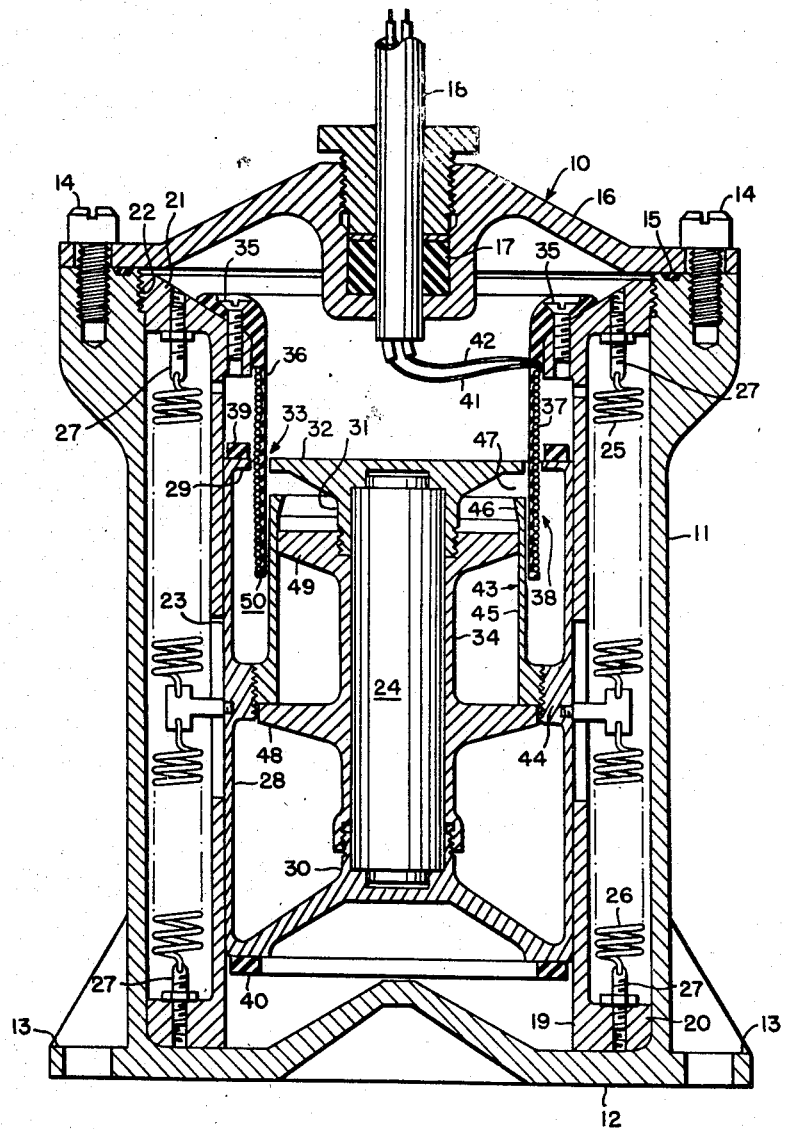
INVENTOR.
Samuel Edward Dawson
BY N. J. Houfeld
ATTORNEY.

Patented June 19, 1951

2,557,080

UNITED STATES PATENT OFFICE 2,557,080

MAGNETOELECTRIC TRANSDUCER FOR MEASUREMENT OF VELOCITY AND RELATED VALUES

Samuel Edward Dawson, Fairway Hills, Md.

Application September 16, 1948, Serial No. 49,637

6 Claims. (Cl. 177—352)

(Granted under the act of March 3, 1883, as amended April 30, 1928; 370 O. G. 757)

The invention relates to improvements in magneto-electric devices and more particularly to an improved instrument of the magneto-electric transducer type suitable for use in the detection and measurement of vibratory or shock-excited velocities and their time derivatives or integrals. By reversing its operation, the device can also be used as a vibration generator to produce uniform or harmonic motion.

The primary object of the invention is the provision of a magneto-electric device having an improved magnetic circuit including portions wherein objectionable leakage flux is controlled or eliminated so that the response of the device to all types of vibrations may be more accurately interpreted.

The invention also aims to provide a magneto-electric device of the character described which may be used in either a vertical or a horizontal position, which is relatively strong and light so as to withstand extremely high longitudinal and transverse acceleration forces, which has a friable magnetic element so mounted as to withstand shock, and which is completely submersible.

Other objects and many of the attendant advantages of this invention will be readily appreciated as the same becomes better understood by reference to the following detailed description when considered in connection with the accompanying drawing wherein:

The single figure of the drawing is a central vertical longitudinal sectional view of the magneto-electric device.

Referring to the drawing which for the purpose of illustration shows only a preferred embodiment of the invention, the numeral 10 generally designates the improved magneto-electric device including a cylindrical case 11 formed of beryllium copper and adapted to be rigidly fastened at its basal end 12 to a movable body, as by feet 13. Releasably fastened to the opposite end of the case as by screws 14 and engaging a suitable sealing ring 15 is a waterproof cover 16 provided with a packing 17 through which cable 18 extends.

Disposed within the case is a cylindrical support 19 formed of beryllium copper and held in inwardly spaced coaxial alignment with the case as by annular flanges 20, 21. These flanges engage the inside of the case and at least one flange 21 is connected thereto as by screw threads 22.

Reciprocably slidable in the cylindrical support 19 is a seismic element 23 preferably including a magnetizing element comprising an axially-disposed permanently-magnetic bar 24 formed of Alnico V. Obviously an electromagnet could be used instead of the permanently-magnetic bar 24 if desired. Resiliently supported for movement longitudinally of the case 11, as by opposed coil springs 25, 26 and screws 27, is a magnetizable cylindrical shell 28 provided at one end with an inturned annular flange 29 and at its opposite end with an annular coaxially-disposed socket portion 30 fitted on one end of the bar 24. By properly setting the screws 27, the tension of the opposed springs 25, 26 may be so adjusted that the seismic element 23 will normally rest in a predetermined central position in the support 19 when the case 11 is horizontally mounted. In order to compensate for the weight of the seismic element 23 when the case is vertically mounted, the screws 27 may be so adjusted that the tension of the upper or lifting springs 25 will be greater than that of the lower springs 26 whereby the seismic element may be caused to float centrally of the case. Fitted on the other end of the bar 24 is the annular coaxially-disposed socket portion 31 of a disc 32 terminating in a circumferential edge closely spaced within the flange 29 so as to form an annular airgap 33. The shell 28 and disc 32 are made of magnetic metal such as Swedish charcoal iron so as to form a magnetic circuit for the bar 24 including the airgap 33. Encircling the bar 24 is a tension sleeve 34 formed of a non-magnetic material such as beryllium copper and screw-threadedly connected at its ends to the annular socket portions 30, 31 so as to hold the Alnico bar in compression. Even though Alnico is a material that tends to go to pieces under shock, holding the bar in compression enables it to withstand accelerations in excess of 4000 G.

Affixed to the support 19 as by screws 35 is a cylindrical Micarta form 36 supporting a coil 37 that extends through the airgap 33 and terminates in a zone 38 within the shell adjacent the airgap 33. The length of the coil 37 should be greater than the width of the airgap and the stroke of the seismic element should be limited as by bumpers 39, 40 so that the free end of the coil will always be beyond the gap. The cable 18 is connected to the ends 41, 42 of the coil so as to transmit the electrical output thereof to any suitable indicator or recorder (not shown). The zone 38 adjacent the airgap 33 normally would be subjected to leakage flux from the previously mentioned magnetic circuit. Consequently the coil 37 upon relative movement of the case 11 and seismic element 23 would normally cut not only the entire airgap flux but also a variable quantity of leakage flux in zone 38. Thus the signal generated in the coil 37 would depend not only on its movement relative to the seismic element but also on its position in the zone 38.

In order to eliminate this objectionable leakage flux in the path of travel of the coil 37 relative to the seismic element 23, the magnetic circuit is provided with a shunt 43 which comprises an internal annular rib 44 carrying a cylindrical flange 45. This flange is coaxially disposed within the shell and extends through the flux leakage zone 38 alongside the path of travel of coil 37 and at the side thereof opposite the shell, then terminating in an internally-thickened marginal edge 46 spaced from the disc 32 to form an airgap 47. The internally-thickened marginal edge 46 serves to direct the shunt flux inwardly and away from the coil. The non-magnetic sleeve 34 is provided with radial flanges 48, 49 engaging and firmly reinforcing the shell 28 and flange 45 respectively.

The magnetic shunt 43 should be so located and proportioned relative to the main magnetic circuit that the magnetomotive force gradient is the same at opposite points along the shunt and the main magnetic circuit. Leakage flux across the compartment 50 defined by the flange 45 and shell 28 will be eliminated by equalizing the magnetic potentials at corresponding points on opposite sides thereof.

There will of course be a loss of efficiency due to diversion of some of the flux from the main magnetic circuit but this loss is accepted in order to obtain greater accuracy of measurement. In order to minimize the loss of efficiency, the shunt path should be made relatively thin and the shunt gap 47 increased until conditions of equal magnetic gradient exist at corresponding points on the main and shunt paths. Inasmuch as the design dimensions of the magnetic circuit and shunt depend on the permeability of the material used, it is considered necessary to adjust the reluctance of the shunt path for optimum results. To determine the exact dimensions of the magnetic parts by calculation would ordinarily be too complicated and not practical. Although rough adjustments of the shunt path reluctance may be made by variation of the shell thickness, the final adjustment generally should be made by varying the shunt gap width until a ballistic galvanometer search coil (not shown) moving back and forth in the flux leakage zone gives no indication of magnetism. The main gap 33 should be as small as possible for maximum efficiency. The shunt path may be designed for a flux diversion of about 25% so that there will be a relatively small ratio of by-pass flux to useful flux.

During operation of the device 10, any longitudinal movement of the case 11 will tend to produce movement of the coil 37 relative to the airgap 33. Upon cutting of the airgap flux by the coil 37, a signal of a magnitude proportional to the velocity of the relative movement of the case 11 and seismic element 23 will be generated. Inasmuch as the free end portion of the coil 37 always operates in the leakage-free compartment 50 and an intermediate portion of the coil 37 always cuts the total flux across the airgap 33, the magnitude of the signal generated will be independent of the position of the coil 37 relative to the gap 33. It is therefore evident that the device 10 is particularly well adapted for use as a detector of vibratory or shock-excited movements of all types, harmonic or non-harmonic, where the accurate measurements of such movements is important.

Obviously many modifications and variations of the present invention are possible in the light of the above teachings. It is therefore to be understood that within the scope of the appended claims the invention may be practiced otherwise than as specifically described.

The invention described herein may be manufactured and used by or for the Government of the United States of America for governmental purposes without the payment of any royalties thereon or therefor.

I claim:

1. In a magneto-electric device of the character described, a magnetic circuit including an airgap and having a flux leakage zone adjacent the airgap, a coil, means supporting said coil for limited movement relative to the magnetic circuit, said coil having a length at least equal to that of said air gap plus a significant portion of said flux leakage zone, said supporting means supporting said coil in a position to cut the flux in said air gap transversely, said coil and supporting means being so constructed and arranged as to keep a portion of said coil always fully across said air gap during movement of said coil, whereby the flux in said airgap and a variable portion of the leakage flux zone is cut by said coil during travel of said coil, and a magnetic shunt comprising a magnetic sleeve longitudinally co-axial with said coil diverting leakage flux around an end of the path of travel of said coil, whereby flux leakage in the path of travel of said coil is eliminated.

2. In a magneto-electric device of the character described, a magnetic circuit including a pair of spaced members providing an airgap and a flux leakage zone adjacent the airgap, a coil having a portion about a first of said members and movable relative to the spaced members, said movement of said coil being in a path comprising portions of said airgap and flux leakage zone, whereby the flux in said airgap and a variable portion of the leakage flux zone is cut, and a magnetic shunt magnetically intimately associated with the other member and having a portion extending between said coil and said first member for diverting flux tending to pass from said first member at one side of the path of travel of said coil to the other member at the other side of said path, the reluctances of said shunt and said other member being so chosen that the leakage of flux therebetween is substantially eliminated.

3. In a magneto-electric device of the character described, a case, a seismic element resiliently supported in the case, said element comprising a permanently magnetic bar, first and second magnetic members conducting flux from opposite end portions of the bar, said members defining an air gap and a flux leakage zone adjacent said gap, a coil supported by the case for movement relative to said gap whereby the flux in said gap and a variable portion of said leakage flux is cut, and a magnetic shunt diverting flux from one of said members at one side of the path of travel of said coil to the opposite side of said path, the reluctances of said shunt and said member being so chosen that the leakage of flux therebetween is substantially eliminated.

4. A magneto-electric device of the character described comprising a magnetic circuit including a magnetizing element and a magnetizable shell spaced to provide an airgap and a flux leakage zone adjacent said airgap; said magnetizing element comprising a bar; a non-magnetic sleeve encircling said bar; a pair of end-members pressing on the ends of said bar; said sleeve being connected to said end-members so as to hold said bar in compression; a coil movable in a path including said airgap and a portion of said flux leakage zone; and a magnetic shunt magnetically intimately associated with said shell and extending between said element and the portion of said coil in said flux leakage zone and magnetically shunting a part of said magnetic circuit for diverting flux from said portion of said flux leakage zone; the reluctances of said shunt and said part of said magnetic circuit being such that the leakage of flux therebetween in said coil-path is substantially eliminated.

5. A magneto-electric device as defined in claim 4 but further characterized by a first of said end-members comprising a disc extending radially outwardly from said bar, and said magnetizable shell being tubular and outwardly spaced from said disc for providing said airgap.

6. A magneto-electric device as defined in claim 4 but further characterized by said magnetizable shell and said shunt being tubular and substantially co-axial with said bar.

SAMUEL EDWARD DAWSON.

REFERENCES CITED

The following references are of record in the file of this patent:

UNITED STATES PATENTS

| Number | Name | Date |
| --- | --- | --- |
| 1,830,401 | Miessner | Nov. 3, 1931 |
| 2,029,282 | Serge | Jan. 28, 1936 |
| 2,062,938 | Ruppe | Dec. 1, 1936 |
| 2,189,597 | Wells | Feb. 6, 1940 |
| 2,271,864 | Honnell et al. | Feb. 3, 1942 |
| 2,286,386 | Silverman | June 16, 1942 |
| 2,303,413 | Washburn | Dec. 1, 1942 |
| 2,307,792 | Hoover | Jan. 12, 1943 |
| 2,348,225 | Petty | May 9, 1944 |